Oct. 5, 1954  G. J. MELCHER  2,690,898
MOVABLE FENCE
Filed Oct. 30, 1952
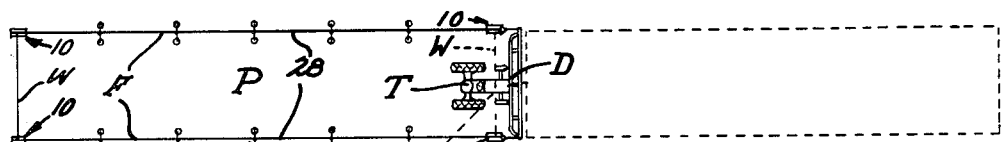
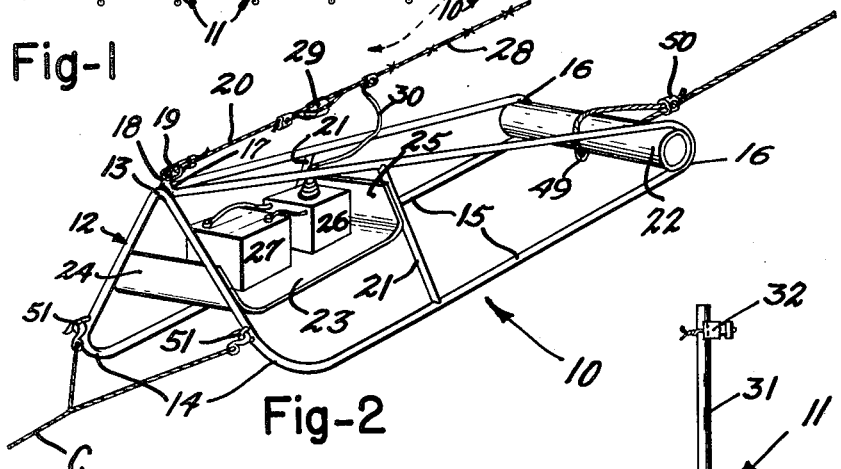
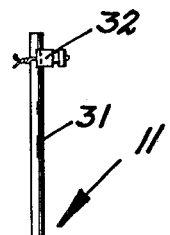
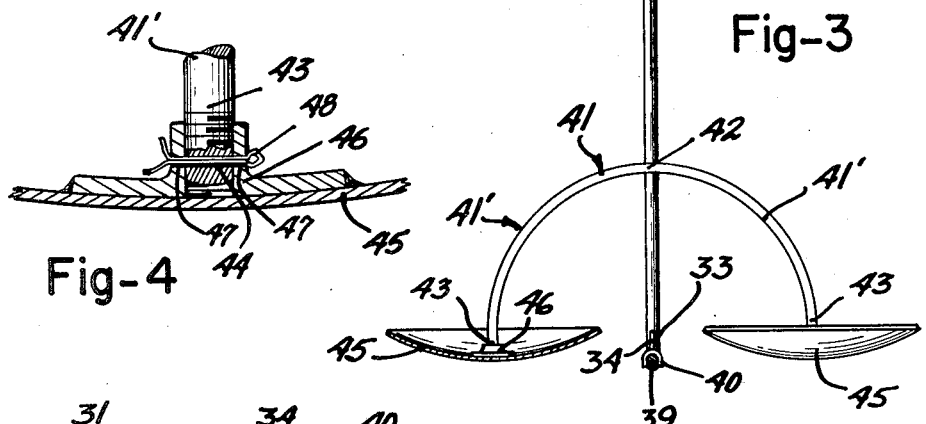
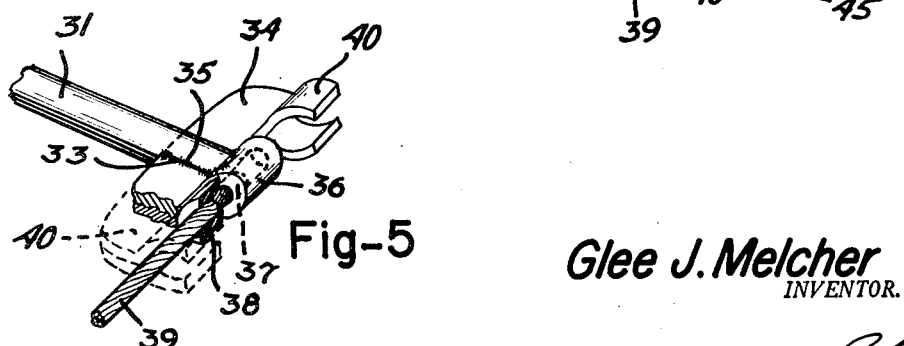
Glee J. Melcher
INVENTOR.
BY Glenn L. Fish
attorney Patented Oct. 5, 1954

2,690,898

UNITED STATES PATENT OFFICE 2,690,898

MOVABLE FENCE

Glee J. Melcher, Eugene, Oreg.

Application October 30, 1952, Serial No. 317,641

2 Claims. (Cl. 256—21)

This invention relates to fences and more particularly to movable fences.

One object of the invention lies in the provision of a movable fence which will enable one to change the boundaries of a pasture area, or the like, as desired.

Another object of the invention lies in the provision of a movable fence having spaced upright supporting posts slidable upon the surface of the ground and adapted to be maintained in an upright position while being moved.

Another object of the invention lies in the provision of a movable fence having a plurality of spaced upright posts united at their lower ends by means of a nonextensile line and supported against transverse tilting by transversely opposed skids.

Another object of the invention lies in the provision of a movable fence having end posts which are adapted to be pulled by means of a tractor and towing chain.

Another object of the invention lies in the provision of a movable fence which is inexpensive to manufacture and may be made from a minimum number of parts assembled with facility.

The cost of fencing a large acreage for pasture runs considerably high, and, further, in a large expanse of pasture land the flora contains noxious weeds and foliage which are harmful to cattle when consumed in a large quantity, but which do no apparent harm to the cattle when ingested in a reasonable amount. To reduce the amount of harmful foliage the cattle are able to eat in a given time, it is necessary to divide the pasture into small areas which will accommodate the number of head to be pastured for a short time. To provide permanent fencing interferes with the cultivation of the land and is prohibitive from a monetary standpoint. It is, therefore, an object of the invention to provide inexpensive means for dividing an area into smaller plots.

These and other objects of the invention will become apparent during the course of the following description.

In the accompanying drawings, in which like numerals are employed to designate like parts, Figure 1 is a diagrammatic view showing my improved movable fence utilized for defining a limited pasture area and further showing at dotted lines a system of moving the fence.

Figure 2 is a perspective view on an enlarged scale of an end post comprising a part of my improved movable fence;

Figure 3 is an enlarged transverse view of a supporting post partially in elevation and partially in cross section;

Figure 4 is a detailed transverse cross section upon an enlarged scale of the connecting means between a supporting arm and its companion ground-engaging skid; and Figure 5 is a fragmentary perspective view on an enlarged scale showing the releasable cable connectors at the lower end of the supporting posts.

Referring now more particularly to the drawing, I have indicated in Figure 1 a pasture P defined at its sides by longitudinally extending parallel fences, indicated in general by the letter F, and which may be closed at each end by means of a single strand of wire W. The fences each comprise an end post 10 at the extreme ends thereof and a plurality of spaced upright supporting posts 11 between the companion end posts 10. The end posts are each constructed as shown in Figure 2 preferably of tubular material formed at its outer end with a vertical inverted V-shaped wall 12, having its apex 13 midway the transverse dimension of the end post. The tubes extend downwardly at an outward incline from the apex 13 and are bent rearwardly at 14 to form runners or skids 15. Runners 15 are parallel with relation to each other and at their rear end 16 are provided with upward radius bends and thence extend forwardly converging and securing their forward end portions 17 at the apex 13. One of the converging end portions is bent upwardly at 18 and is drilled transversely to receive a securing ring 19 to which a fence line wire 20 is secured. Angular braces 21 extend between the runners 15 and the converging upper portions of the tube to properly brace the end posts. A transversely extending tube 22 is secured as by welding at the rear ends 16 of the runners in the radius of the bends forming an anchor and further strengthens the end posts.

A supporting tray 23 is secured between the front wall 12 and angular braces 21 and has front and rear protecting portions 24 and 25. Carried by the tray I have shown an electric fence unit 26 and an operating battery 27 adapted to electrify the fence line 28 secured to the fence line wire 20 by means of an insulator 29. The electric current may be connected from the electric fence unit 26 by means of a pigtail 30 electrically connected therebetween. Obviously the tray 23 may be omitted from selected ones of the end posts which do not support the electrifying unit if desired.

Each of the spaced upright supporting posts comprises a vertical rod or post 31, which has at least one fence line securing means, such as insulator 32, carried by its upper end, and at its lower end the post 31 is bifurcated at 33 and a securing plate 34 is mounted therein and may be fastened as by rivets or welding as shown at 35.

The securing plate is provided at its lower marginal edge with a tubular sleeve 36 adapted to receive a finger 37 which extends from a knob 38 secured to the end of a nonextensile cable segment 39, which forms a connecting line, the finger being axially aligned with the cable 39. The plate is formed along its lower marginal edge and at its ends with inverted U-shaped yokes 40, which are adapted to receive therebetween the body of the cable segments 39 and are of a size to preclude movement of knobs 38 through the yokes 40.

A semi-circular rod 41 is secured midway its length as by welding or other suitable means at 42 to the supporting posts 31 defining arcuate arms 41' and disposing its free ends 43 substantially in transversely spaced vertical axes. As shown in Figure 4, the free ends of the arms 41' are externally threaded and are drilled at 44 to form a transverse bore therein. Ground-engaging skids 45 which are concavo-convex in shape are removably secured to the ends 43 of the arms 41' by means of internally threaded and flanged collars 46. Diametrically opposed holes 47 are drilled in the collar and aligned with the bore 44 to receive a cotter pin 48 to prevent accidental unthreading of the collar from arm 41'.

The cable segments 39 secure between the supporting posts 11 excepting the end segments which secure to the first successive supporting posts 11, and the opposed ends are passed about the cable anchors 22 through guide rings 49 and are secured to themselves by means of cable clamps 50.

As shown in Figure 1, when it is desired to move the fence to encircle a different area, a tractor T which has a drag bar D may be employed and towing chains C may be connected through loops or eyes 51 of the end posts 10 and the complete unit moved to the position shown in dotted lines of Figure 1. The wire W may then be connected across the fence line 28 at the end thereof. The next move of the fence would be from the dotted position to a position parallel and adjacent the position shown in full line of Figure 1 as indicated by the dotted arrow.

Although I have shown my improved movable fence in conjunction with an electric fence unit and only a single fence line, obviously the fence could be provided with multiple fence lines and omit the electric unit if desired.

Having thus described my invention, I claim:

1. A movable fence comprising end posts and at least one intermediate post, a fence line interconnecting said posts, each of said end posts having a pair of laterally spaced substantially parallel skids connected thereto and said intermediate post having laterally spaced ground engaging skids, whereby the fence may be moved along the ground.

2. The fence as set forth in claim 1 wherein a second fence line interconnects said posts adjacent the ground.

References Cited in the file of this patent

UNITED STATES PATENTS

| Number | Name | Date |
| --- | --- | --- |
| 657,627 | Turner | Sept. 11, 1900 |
| 2,396,512 | Johnson | Mar. 12, 1946 |

FOREIGN PATENTS

| Number | Country | Date |
| --- | --- | --- |
| 55,607 | Netherlands | Oct. 16, 1943 |